United States Patent
Thagard, III et al.

(10) Patent No.: US 8,017,663 B2
(45) Date of Patent: Sep. 13, 2011

(54) MODIFIED ASPHALTIC FOAM MATERIALS

(75) Inventors: George F. Thagard, III, Coto de Caza, CA (US); Nicolae Achim, Grand Terrace, CA (US)

(73) Assignee: Devpat, LLC, Fontana, CA (US)

( * ) Notice: Subject to any disclaimer, the term of this patent is extended or adjusted under 35 U.S.C. 154(b) by 1404 days.

(21) Appl. No.: 10/772,049

(22) Filed: Feb. 4, 2004

(65) Prior Publication Data
US 2005/0171223 A1    Aug. 4, 2005

(51) Int. Cl.
*C08J 9/04* (2006.01)

(52) U.S. Cl. ........ 521/101; 521/128; 521/129; 521/130; 521/131; 521/170

(58) Field of Classification Search .................. 521/101, 521/128, 129, 130, 131, 170
See application file for complete search history.

(56) References Cited

U.S. PATENT DOCUMENTS

| 3,810,860 | A | * | 5/1974 | Doyle | ............................ 528/85 |
| 4,225,678 | A | | 9/1980 | Roy | |
| 5,232,530 | A | | 8/1993 | Malmquist et al. | |
| 5,305,569 | A | | 4/1994 | Malmquist et al. | |
| 5,786,085 | A | | 7/1998 | Tzeng et al. | |
| 5,813,176 | A | | 9/1998 | Tzeng et al. | |
| 5,816,014 | A | | 10/1998 | Tzeng et al. | |
| 5,837,363 | A | * | 11/1998 | Colafati | ................... 428/311.11 |
| 5,965,626 | A | | 10/1999 | Tzeng et al. | |

FOREIGN PATENT DOCUMENTS

| EP | 0545418 B1 | 4/1998 |
| ES | 375769 | 1/1970 |
| JP | 52151395 | 12/1977 |
| JP | 54003199 | 1/1979 |

* cited by examiner

*Primary Examiner* — John Cooney
(74) *Attorney, Agent, or Firm* — Knobbe Martens Olson & Bear LLP

(57) ABSTRACT

An asphaltic isocyanurate foam useful in roofing applications. Asphalt is liquified and mixed with a mixture of polyisocyanate. In a separate mixture, other chemicals, such as polyols, surfactant, catalyst, and blowing agent are combined. The mixtures are combined and reacted to form an asphaltic polyurethane foam.

30 Claims, 8 Drawing Sheets

MODIFIED ASPHALTIC FOAM MATERIALS

BACKGROUND OF THE INVENTION

1. Field of the Invention

The present invention relates to asphaltic foams which are useful in roofing and in other applications.

2. Description of the Related Art

1. Asphaltic Foams

Many attempts have been made to incorporate asphalt into polyurethane foams. Primarily, asphalt has been used as a filler material for such foams, due to the fact that it is less expensive than the precursor chemicals used to produce polyurethane foam. For example, in Spanish Patent Application No. 375,769, a process is described in which asphalt powder is added to a polyurethane precursor mixture as a filler material. The asphalt powder and polyurethane form a uniformly distributed plastic mass.

The addition of asphalt to a polyurethane foam can also, however, impart certain desired characteristics to the foam. In Japanese Patent Application No. 76/64,489, for example, a polyurethane foam was waterproofed through the addition of asphalt to the polyurethane precursors. Another asphalt-polyurethane mixture having good sound absorption and anti-vibration properties is disclosed in Japanese Patent Application No. 77/68,125.

Most prior art processes for incorporating asphalt into polyurethane, such as Japanese Patent Application No. 76/64,489, have made use of soft asphalts with low softening points. Such asphalts can be liquified and blended with polyols at relatively low temperatures to form a uniform, liquid mixture of asphalt and polyols. By completely blending the liquified asphalt with the polyols, a uniform asphalt-polyurethane foam product can then be produced. In addition, because low softening point asphalt remains liquid at relatively low temperatures, the asphalt-polyol mixture can be reacted to form a foam at temperatures which are low enough that a controlled reaction can take place. However, such foam products generally have a relatively low asphalt content.

In Japanese Patent Application No. 76/64,489, for example, a soft asphalt having a needle penetration degree of 80 to 100 is used. This asphalt has a correspondingly low softening point of under 150°. In the process of this patent, the asphalt is mixed with polyurethane precursors, and this mixture is then reacted to form a compressible product, i.e. a soft foam.

The use of such soft asphalts in prior art processes is acceptable when it is desirable for the resulting product to be a soft foam. However, in certain applications, a rigid asphaltic polyurethane foam would be advantageous. A process for making a rigid asphaltic polyurethane foam is disclosed, for example, in U.S. Pat. No. 4,225,678 to Roy. In this process, relatively high molar ratios of isocyanate to polyols are recommended, in some cases as high as 11:1. The Roy process therefore resulted in products which were too friable and/or which lacked sufficient compressive strength. When conventional roofing asphalt having a softening point of over 200° F. was used in the Roy process to produce asphaltic foams, the foaming reaction also was too fast, making manufacturing of asphaltic foams impracticable.

In U.S. Pat. Nos. 5,786,085; 5,813,176; 5,816,014; and 5,965,626 all to Tzeng et al., all herein incorporated by reference, an asphaltic foam useful in roofing applications is disclosed.

2. Asphalt in the Roofing Industry

Various asphalt-coated or asphalt-impregnated materials are in common use in the roofing industry. For example, water absorbent paper which has been saturated with low softening point asphalt, known as saturated felt, is usually placed underneath other roofing components. The asphalt of the saturated felt provides the felt with secondary water repellency.

Higher softening point asphalt is put on either side of saturated felt to form base sheets, which go under the tiles of a roof to build up the roof system. Base sheets with mineral surfacing on their upper surfaces, known as mineral surface rolls, provide enhanced durability and fire retardancy to a roof and can also enhance a roofs appearance. Mineral surface rolls have been used as ridge caps, the largely ornamental structures which straddle the peak of a roof.

However, asphalt-impregnated papers suffer from various drawbacks. When used as ridge caps, for example, mineral surface rolls must be bent to fit the ridge-line of a roof. Mineral surface rolls are also sometimes bent to make them thicker and give a ridge-line a layered appearance. Bending a mineral surface roll causes the asphalt and substrate to crack, however, leaving the cracked material exposed to the elements. The mineral surface roll tends to deteriorate at the site of such cracks within 3 to 4 years of being installed or even sooner, resulting in leaks and other roof damage.

Alternative materials, such as rubberized asphalt with a flexible polyester substrate, have also been used in the roofing industry. For example, modified asphalt has been used in mineral rolls to avoid cracking the asphalt and its substrate.

3. Polyurethane Foam in Shingles and Ridge Caps

One method for combining a polyurethane foam and an asphaltic material in roofing applications is suggested in U.S. Pat. Nos. 5,232,530 and 5,305,569 to Malmquist, et al. These patents teach that a polyurethane foam can be attached to the underside of an asphaltic material in order to produce a roofing shingle. Of course, this involves the manufacturing step of physically attaching the foam to the asphaltic material or otherwise forming the foam on the asphaltic material. The polyurethane foam and asphaltic material layers can, in addition, become delaminated.

SUMMARY OF THE INVENTION

As can be seen from the foregoing, there remains a need for improved asphalt-containing roofing materials, particularly for use as ridge caps and shingles. In addition, there is a need for asphaltic foams having greater rigidity which are adapted for use in manufacturing foam articles. These and other needs are met by the asphaltic foams and foam products disclosed in embodiments described herein, and by the methods described herein for producing these foam products.

A preferred embodiment comprises method for making an asphaltic foam, said process comprising the steps of:
  providing an asphalt;
  liquefying said asphalt;
  adding to said asphalt one or more isocyanates, thereby forming a first intermediate mixture;
  bringing the temperature of said first intermediate mixture to between about 120° F. and 170° F.;
  forming a second intermediate mixture comprising one or more polyols, a blowing agent, a surfactant, and optionally, a fire retardant compound, and a curing catalyst; and
  mixing said first intermediate mixture with said second intermediate mixture, thereby forming a final reaction mixture, wherein said first intermediate mixture and said second intermediate mixture react to form said asphaltic foam.

Another embodiment comprises a method of forming a ridge cap or roofing tile comprising the steps of:

providing a conveyor belt;
applying a granule layer to said conveyor belt;
providing a mold with a top side open;
filling the mold with a reaction mixture made in accordance with the foregoing;
applying the mold with the open side down on said granule layer; and
curing the asphaltic foam; thereby forming the ridge cap or roofing tile.

DETAILED DESCRIPTION OF THE PREFERRED EMBODIMENT

Figure 1A:
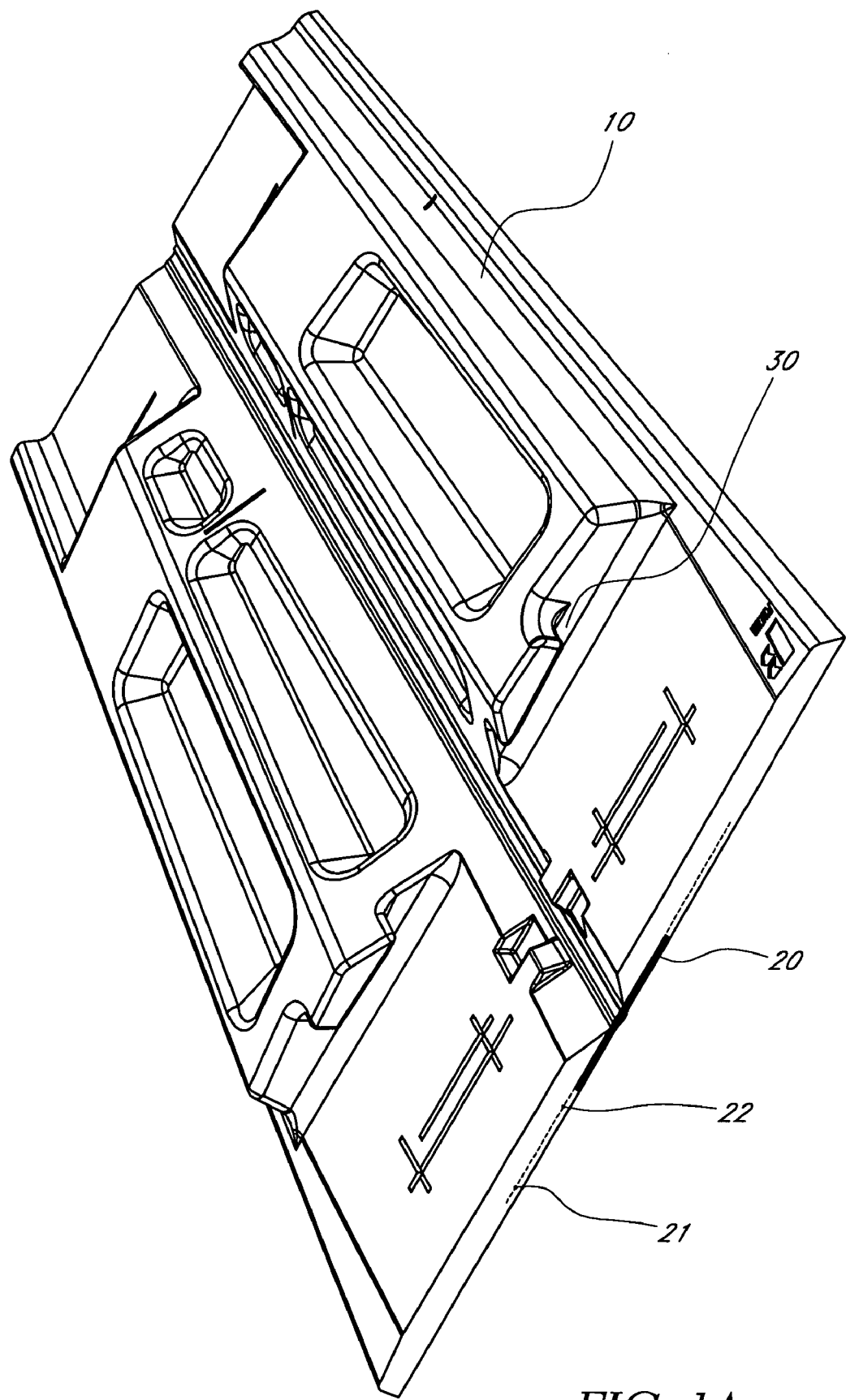
FIG. 1A illustrates a regular non-venting ridge cap turned upside down, where two undercut areas 30, used for interlocking to the next cap on the ridge, are shown.

Asphalt has long been used in waterproofing applications, particularly in the roofing industry. In the roofing industry, asphaltic materials are used due to their low cost, durability, and ability to withstand water and extremes of heat. Papers saturated or impregnated with asphalt, for example, are commonly used to cover roofs.

Asphaltic papers are not very well suited to some applications, however. They are relatively thin, and therefore do not impart the aesthetic qualities which thicker materials impart. In addition, when making ridge caps, asphaltic papers must be bent to fit the ridge line of the building. Because asphaltic papers are relatively inelastic, however, once bent they cannot retake their prior shape. During bending, the fibers of the paper as well as the asphalt itself is cracked and damaged.

There is therefore a need for an asphalt-containing material which can be used in structural applications and which has properties not heretofore found in other asphaltic materials.

I. Definitions

As used herein, the terms listed below shall be defined as follows, unless a contrary meaning is clear meant in context:

"Foaming reaction" shall mean a sum of chemical reactions that concur when a polyisocyanate is put in contact with a polyol and water to form a polyurethane and carbon dioxide as a blowing agent.

"Modified asphalt" shall refer to asphalt which has been blended with polypropylene, particularly atactic polypropylene, or with other asphalt modifiers such as styrene-butydiene-styrene (SBS) or Vistamer™, a surface modified particulate rubber.

"Penetration" shall mean the hardness of a material, as measured by the resistance of the material to penetration by a needle mounted on a penetrometer. A penetrometer is a device which holds a needle with a 100 gram (+−0.05 grams) load and moves vertically without measurable friction. To determine the penetration value of a material, the tip of the needle of a penetrometer is positioned on the surface of a material whose hardness is to be tested, and the needle is allowed to penetrate into the material for 5 (.+−.0.1) seconds at 77° F. (25° C.). The amount of penetration is rated in terms of the length of the needle, measured in tenths of millimeters, which penetrated the material in those 5 seconds. A numeric value corresponding to amount of penetration, in tenths of millimeters, is then assigned as the penetration value of the material. This procedure follows the standard test method for the penetration of bituminous materials promulgated by the American Society for Testing and Materials (ASTM Designation D 5-83). Since a needle will pass through a softer material more rapidly than a harder material, higher penetration values correspond to softer materials.

"Reaction mixture" shall refer to any combination of reactants used in the process of the preferred embodiments prior to being reacted in a foaming reaction.

"Softening point" means the temperature at which asphalt attains a particular degree of softness. Asphalt does not have a definite melting point, but instead changes slowly from a harder to a softer material with increasing temperature. The softening point is determined by placing a steel ball (9.53 mm in diameter) on a mass of asphalt contained in a brass ring. The ring has a brass plate at the bottom in contact with the asphalt sample. The asphalt and ball are then heated in a water or glycerol bath until the ball drops to the plate, which is 25 mm under the ring. The temperature at which the ball drops to the plate is the softening point. This procedure follows the standard test method for the softening point of bitumen promulgated by the American Society for Testing and Materials (ASTM Designation D 36-76).

The foregoing definitions pertain as well to other grammatical forms derived from these terms, including plurals.

II. Improved Asphaltic Foam

A. Reactants

1. Asphalt

Asphalt is a solid or semisolid mixture of hydrocarbons and small amounts of non-hydrocarbon materials, occurring naturally or obtained through the distillation of coal or petroleum. Most of the hydrocarbons in asphalt are bituminous, meaning that they are soluble in carbon disulfide. As is known to those of skill in the art, asphalt is a complex, colloidal mixture containing a broad spectrum of different hydrocarbon components. These components can generally be broken down into three main categories: two solid components, the asphaltenes and asphaltic resins, and one liquid component, the oily constituents.

Asphaltenes generally comprise the highest molecular weight and most aromatic components of asphalt. Asphaltenes are defined as the components of asphalt which are soluble in carbon disulfide but insoluble in paraffin oil (paraffin naphtha) or in ether.

Broadly categorized, the asphaltic resins and oily constituents can be further separated into saturated components, aromatic components, and resins or polar components. The polar components are responsible to some degree for the viscosity of an asphalt.

In order to produce an asphaltic foam of the preferred embodiments, asphalt meeting certain specifications must be used in the process for manufacturing this foam. We have found that the hardness of the asphalt component of the foam contributes to the rigidity of the final foam product. Therefore, in order to give the final product sufficient rigidity, an asphalt having a penetration range of about 5 to about 25 should be chosen. Preferably, an asphalt having a penetration range of between about 8 and about 18 is used, and more preferably an asphalt having a penetration of about 12 is used. However, in order to keep the reactants at a lower temperature range (about 120° F.-170° F.) where the reaction rate is controlled, asphalt with penetration range of about 90-110 and softening point of about 110° F. can be used.

The hardness of asphalt is, in turn, generally correlated to its asphaltene content, although the asphaltic resin components of asphalt will also contribute to an asphalt's hardness. The asphalt used to produce the foam of the preferred embodiments preferably has an asphaltene content in the range of about 10% to about 30% by weight, more preferably in the range of about 12% to about 18%. In a particularly preferred embodiment, the asphalt used in the preferred embodiments has an asphaltene content of about 12%.

The asphalt used to produce the present asphaltic foam must, in addition, be chosen so as to have a relatively low softening point. An asphalt having a softening point of about 100° F. to about 200° F. should be used. Preferably, an asphalt having a softening point of about 100° F. to about 150° F. is used, and more preferably an asphalt having a softening point of about 120° F. is used. As is known to those of skill in the art, the softening point of asphalt is influenced by the resin or oil content of the asphalt.

The asphalt used to produce the present asphaltic foam must, in addition, be chosen so as to have a lower viscosity. Preferably, the lower viscosity can be achieved without the use of viscosity reducers.

A preferred asphalt for use in the preferred embodiments is a non-blown (i.e., not air-oxidized) asphalt obtained from Paramount Petroleum (California) having the following specifications: a softening point of greater than about 90° F. and less than about 120° F., and a penetration range of greater than about 85 and less than about 120. This asphalt is composed (in weight percentages) of about 12-13% asphaltene, about 9-12% saturated hydrocarbons, about 38-44% polar aromatics, and about 35-38% naphthalene aromatics. For example, Saturant 701 asphalt meeting these specifications can be used. A use of a preferred asphalt is advantageous such that with mixing of the preferred asphalt and isocyanate, flaking or boiling off of the components would not occur. Additionally, a use of a preferred asphalt will result in an asphaltic foam that is more flexible.

In total, the asphalt component of the reactants used in the process of the preferred embodiments can comprise up to about 24% by weight of the final finished product. Asphalt can, however, make up between about 5% and about 33% of the finished product used in the present process.

The use of lower amounts of asphalt in the process of the preferred embodiments will not significantly affect the reaction of that process. However, using greater amounts of asphalt than this can lead to the reaction mixture becoming more viscous (in the absence of viscosity reducers), necessitating the use of higher reaction temperatures in order to blend the reaction mixture components. This in turn increases the reaction rate to a point which becomes hard to control during manufacturing.

Generally, the more asphalt used, the more economical the final product will be, since asphalt is generally less expensive than the other components of the present asphaltic foam. Asphalt does, however, require energy to heat it. Higher asphalt levels will also lead to higher viscosity in the reaction mixture, which may cause manufacturing difficulties.

In addition, the amount of asphalt used will affect the physical properties of the finished asphaltic foam product of the preferred embodiments. With a higher asphalt content, the foam tends to be softer and to have a higher density. More free asphalt can also be extracted from the foam at higher asphalt levels.

2. Asphalt Modifiers

When producing the asphaltic foam of the preferred embodiments, it is possible, though not essential, to blend an asphalt modifier into the asphalt component of the reaction mixture. For example, the addition of polypropylene to the asphalt enhances the strength of the final foam product of the present process. Atactic polypropylene (APP) is particularly preferred because it blends well with the asphalt.

When polypropylene is used in the present process, it is blended into the asphalt component of the reaction mixture in an amount of up to about 10% by weight of the asphalt. More preferably, polypropylene is added in an amount of between about 3% and about 8%, and more preferably still is used in an amount of about 5% by weight of the asphalt.

In order to blend the polypropylene into asphalt, the asphalt is first heated to about 400° F. The polypropylene is then dropped into the hot asphalt and blended in with a mechanical mixer. Atactic polypropylene typically has a melting point of over 350° F. and so will melt on exposure to the hot asphalt.

Other modifiers can also be used in the same way as APP to modify the characteristics of the asphalt and/or the characteristics of the final asphaltic foam product of the preferred embodiments. Such modifiers include isotactic polypropylene (IPP), styrene-butydiene-styrene (SBS), styrene-isoprene-styrene (SIS), ethylene-propylene (EPM), ethylene-propylene-diene (EPDM), ethylene-vinyl acetate (EVAc), ethylene-acrylic ester (EAC), ethylene copolymer bitumen (ECB), polyethylene (PE), polyethylene chlorosulfonate (CMS), polyvinylchloride (PVC), butyl rubber (IIR), polyisobutylene (PIB), and polychloroprene (CR). If the modifier used has a lower melting point than APP, the asphalt in that case only needs to be heated to a sufficient temperature to cause the modifier to melt and blend into the asphalt and to cause the asphalt to be sufficiently liquid so that other components can be mixed into the asphalt.

One modifier which has been found to be particularly useful is Vistamer™ (sold as Vistamer™ R or Vistamer™ RD, depending on the water content of the particles), which is a surface modified particulate rubber product made by Composite Particles, Inc. (2330 26th St. SW., Allentown, Pa. 18103). Vistamer™ is a free-flowing black powder made from post-consumer tire materials. When added to the asphalt used in the present process in an amount of about 10% (by weight of the asphalt), Vistamer™ not only improves the viscosity of the asphalt and makes it easier to blend the asphalt with the polyol component of the process, it also increases the compressive strength of the final foam product by about 10-15%. Smaller amounts of Vistamer™ can also be added, of course, and this modifier can also be used together with other modifiers, in amounts of up to about 10% total modifier (by weight of the asphalt). Due to the high melting point of Vistamer™, it is preferable to heat the asphalt to about 400° F. before adding the Vistamer™ to the asphalt.

3. Polyols

Polyols are one of the precursors necessary to form a polyurethane or isocyanurate foam. A polyol is a hydrogen donor having a plurality of hydroxyl groups (—OH). Polyols also sometimes comprise other hydrogen donor moieties, such as —NH, —SH, and/or —COOH. NH groups are generally more reactive than OH groups, followed by SH and COOH groups in reactivity. Polyols comprised mainly of —OH hydrogen donors react quickly enough to be commercially feasible but not so quickly as to produce a foaming reaction which cannot be controlled. Polyols comprised mainly of —OH hydrogen donors and polyols with amino groups have been found to be preferred in the present process.

In the foaming reaction of the present process, the polyisocyanate mixed with asphalt prior to reaction, is reacted with a mixture of polyols to form an asphaltic polyurethane or isocyanurate foam (depending on the proportion of polyisocyanate in the mixture). The polyisocyanate/water reaction is employed to form the carbon dioxide gas as blowing agent. Several characteristics of the polyols influence their reactivity in foaming reactions as well as the nature of the foams produced by such reactions. One characteristic of the polyols is its functionality, that is, the number of reactive sites per molecule, such as hydroxyl groups or amino groups, available to react in a foaming reaction.

It is preferable to use a polyol having between 3 and 6 functionalities to produce the asphaltic foam of preferred embodiments. More preferably, the polyol has more than three functionalities per polyol molecule. Alternatively, a mixture of polyols which, in aggregate, have an average of between about 3 and 6 functionalities (preferably more than 3) can be used in the present process. In the present process, the best results have, in fact, been obtained when polyols used in the process comprise a mixture of the following two polyols:
  (1) Carpol TEAP 265 (made by Carpenter, Chemicals Division, Richmond, Va. 23230), which has an average of 3 functionalities per molecule, a hydroxyl number (mg KOH/g) of 635, and a molecular weight of about 265;
  (2) Carpol GP-6015 (made by Carpenter, Chemicals Division, Richmond, Va. 23230), which has an average of 3 functionalities per molecule, a hydroxyl number (mg KOH/g) of 26-30, and a molecular weight of about 6000.

When choosing polyols for use in the present process, it is preferred that the polyol or group of polyols have an aggregate molecular weight in the range of about 200-1200, more preferably about 300 to 900, and most preferably a molecular weight of about about 620.

In general, a polyol having a higher functionality will react more quickly in the foaming reaction than polyols with lower functionality.

In addition, the greater the functionality, the greater the amount of cross-linking which will occur in the final asphaltic foam product. Greater cross-linking will generally yield a more rigid product. However, too much cross-linking will yield a product that is brittle and friable. Thus, the functionality of the polyols used in the process of the preferred embodiments should be restricted as described above.

There are several other factors to consider when choosing polyols for use in the preferred embodiments. The viscosity of a polyol, for example, is important. Less viscous polyols are generally preferred, since the asphalt component of the reaction mixture is itself highly viscous, and less viscous polyols can help to lessen the viscosity of the reaction mixture. Polyols with a lower equivalent weight are also preferred for conferring more strength to the foam but a certain amount of high equivalent weight polyols is desirable for bringing in some foam flexibility.

A preferred mixture of polyols for use in the preferred embodiments comprise Carpol TEAP 265 and Carpol GP-6015. A preferred mixture of polyols for use in the preferred embodiments has a viscosity, equivalent weight, and functionality number which is the same as or similar to that of a mixture of amounts of about 1:1 to 2:1 by weight Carpol TEAP 265 to Carpol GP-6015; more preferably about 1.3:1 to 1.9:1; and even more preferably about 1.6:1 to 1.7:1.

Of course, other polyols besides those enumerated above are available commercially and can be used in the present process. Representative polyols which can be used according to the parameters outlined above include both polyester polyols and polyether polyols. Representative polyether polyols include poly(oxypropyrene) glycols, poly (oxypropylene-b-oxyethylene) glycols (block copolymers), poly(oxypropylene) adducts of glycerol, poly(oxypropylene) adducts of trimethylolpropane, poly(oxypropylene-b-oxyethylene) adducts of trimethylolpropane, poly(oxypropylene) adducts of 1,2,6-hexanetriol, poly(oxypropylene) adducts of pentaerythritol, poly(oxypropylene-b-oxyethylene) adducts of ethylenediamine (block copolymers), and poly(oxypropylene) adducts of sucrose methylglucoside, sorbitol. Representative polyester polyols include those prepared from the following monomers: adipic acid, phthalic anhydride, ethylene glycol, propylene glycol 1,3-butylene glycol, 1,4-butylene glycol, diethylene glycol, 1,2,6-hexanetriol, trimethylopropane and 1,1,1-trimethylolethane. Other polyols which can be used include N,N,N',N'-tetrakis(2-hydroxy-propyl)-ethylenediamine, which is commercially available under the trade name of "Quadrol" from BASF Wyandotte Corporation.

4. Blowing Agent

In order to produce an asphaltic foam product with a greater degree of foaming, compositions referred to as "blowing agents" can be added to the reaction mixture. When added to a reaction mixture, blowing agents are initially liquids. However, blowing agents become gaseous during the foaming reaction and expand in volume. Such expansion causes the now gaseous blowing agents to exert force against the polymerizing reactants, thereby forming bubbles or cells in the final foam product.

One blowing agent which can be used is water. When water is added to the reaction mixture, it reacts with the polyisocyanate in the mixture to give an amine or polyamine and also carbon dioxide. Since water is dispersed homogeneously in the mixture, the carbon dioxide gas is evolved throughout the cell structure. It is advantageous for such carbon dioxide to be formed during the foaming reaction, in order for the bubbles formed by the carbon dioxide to produce the cells characteristic of polyurethane and isocyanurate foams. Therefore, polyisocyanate and water should not be mixed together until the foaming reaction is begun.

When water is used as the sole blowing agent in the present process, it is added to the reaction mixture in an amount of between about 0.5% and about 5% by weight; more preferably in an amount of between about 0.7% and about 2.5% by weight; and even preferably in an amount of about 1.3% by weight, based on the weight of the reaction mixture containing polyols. If other blowing agents were added to the reaction mixture in addition to water, a correspondingly lesser amount of water would be added. Excess water should not be added, because the water is a reactant and will react with the isocyanate, thereby preventing the isocyanate-polyol reaction. The addition of too much water would prevent a foam cell structure from forming and would cause too much carbon dioxide to evolve.

Other blowing agents used to foam polyurethane or isocyanurate polymers generally operate by vaporizing at temperatures which are lower than that at which the foaming reaction takes place, rather than by reacting with any of the components of the reaction mixture. Such other blowing agents include halocarbons, such as trichlorofluoromethane, dichlorodifluoromethane, and methylene chloride; ethanol mixed with dibutylphthalate; and other volatile liquids or liquid mixtures. Because these blowing agents act by vaporizing, they are generally added, like water, just before the foaming reaction begins. However, we have found that under most circumstances it is not feasible to use such conventional physical blowing agents due to the temperature requirement of the asphalt-polyol mixture, which is highly viscous at lower temperatures.

5. Polyisocyanate

A number of polyisocyanates can be used to create the asphaltic foam of the preferred embodiments. These polyisocyanates, like the polyols, should have at least two and preferably three functionalities per polyisocyanate molecule.

In the process of the preferred embodiments, polyisocyanates are added to the reaction mixture in a particular stoichiometric molar ratio compared to the amount of polyol added. In order to form a polyurethane asphaltic foam, this ratio should be in the range of about 1.3:1 to 1:1 (polyisocyanate: polyol), and preferably about 1.1:1. In order to form an isocyanurate foam, though, the ratio should be in the range of about 2.0:1 to 2.5:1, and more preferably should be about 2.5:1. In another embodiment, in order to form a polyurethane asphaltic foam, the polyisocyanate is added to the asphalt in a weight ratio of about 0.8:1 to 3.2:1 polyisocyanate:asphalt, and preferably in a ratio of about 1:1 to 1.5:1 polyisocyanate: asphalt.

If the polyisocyanate:polyol ratio is between about 1.3:1 and 2.0:1, an asphaltic foam is also produced. However, the resulting foam will tend to be more brittle than the above-described polyurethane and isocyanurate foams.

In a preferred embodiment, a polyisocyanate molecule having about 3 NCO functionalities is used in the process of preferred embodiments. This molecule is, preferably, a polymeric methylene diphenyl diisocyanate (MDI)-type molecule. Polymeric MDI is preferred due to its low toxicity and low vapor pressure at room temperature. Mondur MR (Miles, Inc.) is a polymeric MDI which has been found to produce a satisfactory asphaltic foam product. Other polyisocyanates which can be used include PAPI 580 (Dow), PAPI 901 (Dow), PAPI 27 (Dow), Mondur E-489 (Miles), Mondur 437 (Miles), Rubinate HF-185 (ICI), and LUPRANATE M70 (BASF).

6. Other Ingredients

A variety of other ingredients can be added to the reaction mixture in minor amounts according to the process of the preferred embodiments in order to impart certain desired characteristics to the final asphaltic foam product. For example, in order to assure an even cell structure in the foam material, a silicone surfactant such as Air Products DABCO DC 5357 can be added during the blending of the polyol-asphalt mixture. If up to about 4% of a surfactant (based on the weight of the polyol and asphalt together) is added to the reaction mixture, a foam having smaller, homogenous cells is obtained.

Plasticizers, such as dioctylphthalate, diisooctylphthalate, dibutylphthalate, diisobutylphthalate, dicaprylphthalate, diisodecylphthalate, tricresylphosphate, trioctylphosphate, diisooctyladipate, and diisodecyladipate, can also be used in the present process to make the reactants used in the process less viscous. Plasticizers in this application act as emulsifiers and as viscosity reducers.

In general, it is preferred not to add catalysts to speed the foaming reaction when producing a polyurethane foam. It has been found, for example, that catalysts such as triethylamine and triethanolamine cause a foaming reaction which is too rapid to be used in manufacturing polyurethane foam products. However, catalysts which speed the curing of the final foam product are advantageously used. Curing catalysts such as Air Products DABCO 33 LV or POLYCAT 5 can be added in amounts of up to 2% based on the total weight of the polyol mixture.

When producing isocyanurate foams, though, a catalyst can be added to the reaction mixture in order to make the foaming reaction sufficiently rapid to be commercially useful. Between about 8% and 10% (by weight of the polyol mixture) of a catalyst such as DABCO® TMR-4 (available from Air Products and Chemicals, Inc., Box 538, Allentown, Pa. 18105) can be added to the polyol mixture prior to the commencement of the foaming reaction in order to produce a rapidly foaming isocyanurate foam product.

In addition, other additives such as flame retardants, fillers, and U.V. protectors can also be added to the reactant mixture in order to impart other desired characteristics to the asphaltic foam of the preferred embodiments without deleteriously effecting the rigidity and other physical properties which are achieved in the final foam product. For example, the flame retardant Antiblaze® 80 and Fyrol 6 (diethyl-N,N-bis(2-hydroxyethyl) aminomethyl phosphonate) have been successfully incorporated into the asphaltic polyurethane foams of the preferred embodiments to increase the flame retardancy of the foam material. Antiblaze® 80 is a neutral, chlorinated phosphate ester which is available from Albright & Wilson, P.O. Box 26229, Richmond, Va. 23260. Flame retardants, if used, are preferably added to the reaction mixture prior to foaming in amounts of about 8% to 10% (by weight of the polyol-asphalt mixture). The flame retardant TCPP (Tris-(chloroisopropyl)phosphate) has also been successfully incorporated into the asphaltic polyurethane foams of the preferred embodiments to increase the flame retardancy of the foam material. Smaller amounts of fire retardant can also be incorporated into the foams of the preferred embodiments, although the amount of fire retardancy imparted to such foams will of course be decreased. Another flame retardant that can be used in the preferred embodiments is VERSASHIELD which is available from Elk Technologies, Inc., Dallas, Tex. VERSASHIELD is a roofing underlayment, a coated substrate product with fire-resistant qualities, upon which the asphaltic foam of the preferred embodiments can be layered.

B. Process Steps

To form the asphaltic foam of the preferred embodiments, the asphalt described above is first heated to a temperature over its softening point, so that polyisocyanate can be mixed homogeneously with the asphalt. The asphalt is preferably heated to about 250-280° F. to assure that the viscosity of the asphalt will be sufficiently lowered to enable proper mixing of the asphalt and polyisocyanate.

Polyisocyanate is added to asphalt to form a first intermediate mixture (Mixture A). When the polyisocyanate is added to the asphalt, the temperature of the reactants will generally be about 120° F. to about 170° F. In order to form a polyurethane asphaltic foam, the polyisocyanate is added to the asphalt in a weight ratio of about 0.8:1 to 3.2:1 polyisocyanate:asphalt, and preferably in a ratio of about 1:1 to 1.5:1 polyisocyanate:asphalt.

A second intermediate mixture (Mixture B) comprises a mixture of polyols and a blowing agent. In Mixture B, polyols are in amounts of between about 5% and about 100% by weight of the asphaltic foam, though they are preferably in amounts of about 32% by weight of the asphaltic foam. As described above, in a preferred embodiment, the polyols which are used in the present process are mixture of amounts of about 1.6:1 by weight Carpol TEAP. 265 to Carpol GP-6015.

Between about 0.5% and about 5%, and preferably about 1.3% water is added to the Mixture B.

Mixture B can also contain, each as an optional component, a surfactant, catalyst, and fire retardant. A preferred surfactant is DABCO DC 5357 in an amount of about 2.4% by weight of Mixture B. Preferred catalysts are DABCO 33LV in an amount of about 0.1% by weight of Mixture B and POLYCAT 5 in an amount of about 0.7% by weight of Mixture B. A preferred fire retardant is TCPP in an amount of about 8-25% by weight of Mixture B, that is, about 5-10% by weight of total foam mixture.

The chemical process comprises pumping Mixture A and Mixture B at about 1.7:1 ratio and a total flow rate of about 7.4 lbs/min. in 2 impingement dispensing heads. The mixed materials can be dispensed on a conveyor that runs continuously and molds can be places over the mixture. Alternatively, the mixed material can be dispensed directly into a mold. An advantage to the present process is the ability to turn off the machinery at any time. Also, cleaning of the impingement dispensing heads is minimal and with ease. Alternatively, for some applications the foam can also be allowed to rise freely without a mold.

The foaming reaction begins as soon as the polyisocyanate is mixed with the remaining ingredients of the reaction mixture. With segregating polyisocyanate from polyol within Mixture A and Mixture B respectively, the foaming reaction can be controlled with mixing of Mixture A (containing polyisocyanate) and Mixture B (containing polyols). With a more controlled foaming reaction, there is less loss of the blowing agent which is able evaporate otherwise. If the Carpol TEAP 265 and Carpol GP-6015 are used as the polyol for this reaction, a moderate, controlled foaming reaction will take place. If other polyols are used, however, some adjustments to the process may need to be made in order to assure a controlled reaction, as outlined above.

The initial stage of the reaction, from the time the Mixture A and the Mixture B come into contact until the time the foam begins to rise, is called the "cream time." During this stage, the foaming reaction mixture thickens. At about 120° F., cream stage lasts for about 15-20 seconds. Thus, the polyisocyanate and other reactants should be mixed together for no longer than about 2-6 seconds before being placed into a mold. Otherwise, the foam may expand to a point beyond that desired in the final molded product, or may cure before taking on the desired form of the mold.

In the second stage of the foaming reaction, called the "rise time," the foam begins to expand. During this stage, sufficient $CO_2$ is produced to cause expansion of the foam. In addition, if blowing agents have been added, such blowing agents volatilize at this time, due to the heat created by the foaming reaction. The length of the cream time and rise time of the foaming reaction will depend on the chemical reaction rate, which in turn depends on the temperature of the mixture, the mold temperature, and the temperature of the environment. The foam is cured when the foam surface is no longer tacky, which usually occurs within about 1.5 to 2 minutes.

One of the great advantages of the present process is that it can be performed under the foregoing conditions, which are sufficiently controlled to be useful in a manufacturing process. Asphaltic polyurethane foams produced by prior art methods were, generally, made using lower percentages of asphalt or softer asphalts, as well as lower reaction temperatures. For this reason, such reactions required catalysts to be commercially useful. However, due to the use of the higher reaction temperatures of the present process, catalysts other than the NH groups which can be present in the polyol should not be used when producing an asphaltic polyurethane foam according to the preferred embodiments.

Although the reaction can be run at temperatures higher than about 180° F., the speed of the reaction increases ten times for every 10° F. increase in temperature over 180° F. Thus, although the present reaction can be performed at temperatures of up to about 200° F., it is not preferred to use such high temperatures due to the greatly increased speed of the reaction and a concomitant increase in the difficulty of manufacture at such increased speed. In the case of certain highly viscous asphalts which can be used according to the preferred embodiments, higher temperatures will help such asphalts to flow better by reducing their viscosity, but, as stated previously, this aid in manufacturing must be balanced against the difficulty of controlling faster reactions.

Using temperatures above about 200° F. is, in most cases, disfavored in the present process. At such higher temperatures, the speed of the foaming reaction becomes unacceptably violent.

Generally, the foam takes about 1.5 to 2 minutes to cure once it has expanded to fill a mold into which it has been placed. However, the cure time will depend on the reaction temperature, the type of polyol used, the process environment, and other variables.

Preferably, the reaction mixture is placed in a mold (or, alternatively, a mold is placed around the mixture) in order to form a molded article. However, for some applications the foam can also be allowed to rise freely without a mold.

The asphaltic foams of the preferred embodiments can, in an alternative embodiment, comprise asphaltic polystyrene or asphaltic PVA foams. In such embodiments, the asphalt used in the present process would be mixed with the precursors of polystyrene or PVA in the amounts described previously in connection with the production of polyurethane and isocyanurate foams.

The present process contains several advantages, including the use of fewer granules, and less need to control viscosity of asphalt. The viscosity is a factor in the amount of granules that can embed into the asphaltic foam: the more viscous the reaction mixture at the time of contacting the granules, the less percolation through the granules and hence fewer granules are embedded into the asphaltic foam. This can be controlled also by choosing a reaction mixture with a higher reaction rate. When the reaction mixture contacts the granules, with a higher extent of reaction, there is a higher viscosity of the reaction mixture. At the same time, if the chemical reaction passes a certain point, the bound between the foam and granules will be weak. In the present process, fewer granules are embedded into the asphaltic foam and the foam to granule bound is very good.

Using the new formulation will result in stronger foams. The reaction mixture has a lower initial viscosity which makes it flow easier in the mold.

Dispensing the reaction mixture into the mold will result in easier flow and the ability to fill out molds with more complicated shapes. Using flexible molds will help the product demolding from molds with very complicated shapes.

In preferred embodiments, a resulting asphaltic foam is semi-flexible and non-caking. One advantage to such an asphaltic foam is durability of the asphaltic foam during shipping and storing of the product. Another advantage to such an asphaltic foam is durability of the asphaltic foam during installation and use of the product, for example withstanding wind and other weather conditions.

EXAMPLE 1

A small batch of an improved asphaltic polyurethane foam is produced as follows and according to Table 1. A non-blown asphalt having a penetration of about 90-110 and a softening point of about 110° F. is first selected. This asphalt is available from Paramount Petroleum. About 1039.5 lb of this asphalt is heated to 250° F. in a container. A Mondur MR polyisocyanate is next added to the asphalt to form Mixture A.

In Mixture B, the polyols are Carpol TEAP 265 and Carpol GP-6015. A mixture of about 873.6 lb Carpol TEAP 265 and about 523.2 lb Carpol GP-6015 is formed. Following this, about 20.8 lb of water is mixed into the reaction mixture. About 131.2 lb of TCPP fire retardant, about 38.4 lb of DABCO DC5357, about 1.6 lb of DABCO 33 LV, and about 11.2 lb of POLYCAT 5 was mixed into the reaction mixture. The TCPP fire retardant is an optional component.

Using high pressure rotary piston pumps with a metering ratio of 1.5:1 (Mixture A:Mixture B), Mixture A and Mixture B were pumped at a flow rate of about 5 lb/min/head in 2 impingement heads. Within about 2-3 seconds, this mixture is then deposited in a mold on both sides of the centerline. The mixture begins rising and forming a foam, and after about 60 seconds the foam is completely formed. Within another about 2 minutes, the foam is cured.

TABLE 1

Materials for Asphaltic Foam

| CHEMICAL NAME | Approximate % | Approximate LBS |
|---|---|---|
| BATCH B | | |
| Carpol TEAP 265 | 54.6 | 873.6 |
| Carpol GP-6015 | 32.7 | 523.2 |
| TCPP | 8.2 | 131.2 |
| Water | 1.3 | 20.8 |
| DABCO DC 5357 | 2.4 | 38.4 |
| DABCO 33LV | 0.1 | 1.6 |
| POLYCAT 5 | 0.7 | 11.2 |
| Total for Batch B | 100 | 1600 |
| BATCH A | | |
| SATURANT 701 | 38.5 | 1039.5 |
| MONDUR MR | 61.5 | 1660.5 |
| Total for Batch A | 100 | 2700 |

III. Structural Applications for Improved Asphaltic Foam

The rigid asphaltic foam of the preferred embodiments can be used in a number of applications in which a structurally strong element is needed. In the construction industry, several such applications are contemplated. The foam of the preferred embodiments can, for example, be used as a light weight alternative to concrete tile. Other contemplated uses include as a walking deck, a slab barrier, recover protection board, concrete expansion board, back fill protection board, and base flashing crickets.

The asphaltic foam of the preferred embodiments can be used to particular advantage in the roofing sector of the construction industry. For example, as discussed previously, there is a need for an alternative material for ridge caps to replace asphaltic papers. By combining the low cost, strength, and durability of asphalt with the molding ability of a plastic material, which can be molded into any desired shape, the foam of the present invention can be used as an alternative to conventional asphaltic paper ridge caps.

A. Ridge Cap Having an Elastomeric Strip

In one embodiment, the asphaltic foam of the preferred embodiments is formed into a bendable ridge cap 10 (FIG. 1A). A ridge cap 10 having an elastomeric strip 20 can be made through molding as shown below.

On a conveyor belt is placed a layer of roofing granules. These granules will serve as a protective weather layer for the ridge cap 10. The granules themselves are preferably about 40 mesh in size (Grade #11), although any size roofing granules can be used, as long as such granules will stick to and cover the surface of the foaming material. The protective layer can also be slate flake or other material capable of providing protection from the weather elements.

The granules are preferably placed on the conveyor belt from a discharge holding tank using a system of dispensing rolls driven by a variable speed electrical motor. This dispensing system drops the granules into a box that holds them directly on the belt. One side of the box is a gate that can be slid up and down allowing a controlled amount of granules to travel away with the belt.

In a preferred embodiment, different solid color granules are gravity fed from 2-3 ton bulk bags into holding tanks or hoppers. From this hopper, the granules are dispensed in controlled ratios on a conveyor belt and from there they are homogeneously colored blended by dropping them several times from one conveyor to another toward the machine holding tank.

The layer of roofing granules is preferably about ¼ deep, but can be between about 3/16" and ½" deep. A scraper having a straight or wavy surface is preferably held over the granule layer at a predetermined height (corresponding to the desired thickness of the granule layer) in order to assure a relatively uniform thickness of the granule layer.

After placing the layer of roofing granules on the moving conveyor, a strip of modified asphalt is placed on top of the granules. The modified asphalt is preferably pumped from a tank by a pump capable of metering the flow of modified asphalt, such as a Viking variable speed control positive displacement gear pump, and then extruded. The strip 20, (FIG. 1A) is between 1" and 3" wide, and is preferably 2" wide. It is also 1/16" to 1/8" deep and is at least as long as the mold. In a preferred embodiment, the strip is continuously extruded onto a granule layer on a conveyor belt. At the compression pressure used to form the foam of the preferred embodiments, the granules of the granule layer which contact the strip will become embedded in the strip, adding to the durability of the ridge cap.

The modified asphalt of this strip is made up of the asphalt of the preferred embodiments in mixture with about 10-20% SBS and about 20-50% limestone filler (by weight of asphalt). This modified asphalt mixture should be sufficiently elastic so that the ridge cap 10 can be bent at an angle. If the ridge cap is to be used only in environments which remain above 4°-5° C., then atactic polypropylene can be used in place of the SBS modifier. However, it has been found that at around 4°-5° C. and below, a strip containing atactic polypropylene as the modifier is too brittle.

A 4"-6" strip of 1/8" fiberglass Bayex netting is placed over the modified asphalt strip, which will keep together all the parts so the product (FIG. 1A, item 21). Optionally, a thin strip of mylar film is preferably placed on top of the modified asphalt strip. The mylar strip will prevent the asphalt from sticking to the mold.

Alternatively, a roofing underlayment for fire retardancy is layered along on top of the modified asphalt strip (FIG. 1A, item 22). In one application the modified asphalt is applied on both the topside and/or backside of a 2" fiberglass mat strip that is then pressed down on the granules. An example of a roofing underlayment is VERSASHIELD. A roofing underlayment acts as a fire barrier and increases strength and flexibility of hinges. In unvented roofs, the roofing underlayment is optional.

The asphaltic foam is produced as described in Example 1 in a mold. In one embodiment, this mold includes a V-shaped member which protrudes upward from the floor of the mold. The V-shaped notch has sides that are at an angle of about 30° from the horizontal plane of the mold. The sides of the mold are preferably of different lengths and thickness so as to give a tapered appearance to a ridge when the ridge caps of the preferred embodiments are laid on top of one another in a staggered manner.

Preferably, the mold is heated to about 200° F. Heating of the mold can be accomplished with blowing hot air with fan. After the asphaltic foam is produced in the mold, the mold containing the asphaltic foam is flipped about 180° so that the top of the mold contacts the granules on the conveyor belt. The asphaltic foam is then compressed and cured onto the granules.

The inside surfaces of the molds used in the preferred embodiments are preferably treated with a spray mold release, such as a silicone based mold release. Alternatively, the inside of the molds can comprise a layer of Teflon® (PTFE) to facilitate the removal of the finished foam product from the molds. Alternatively, a spray mold release comprises motor oil, such as CALISTA 122 motor oil 10W40. Alternatively, a silicone rubber mold can be used without application of a release agent.

The reacted foam on either side of the modified asphalt strip in the final ridge cap product 10 thus does not contact the reacted foam on the other side of the modified asphalt strip, but is instead connected by the modified asphalt strip. Since the modified asphalt strip is elastic, the final ridge cap product can therefore be bent and re-bent along the longitudinal axis of the strip without breaking or weakening the ridge cap.

EXAMPLE 2

Figure 4:
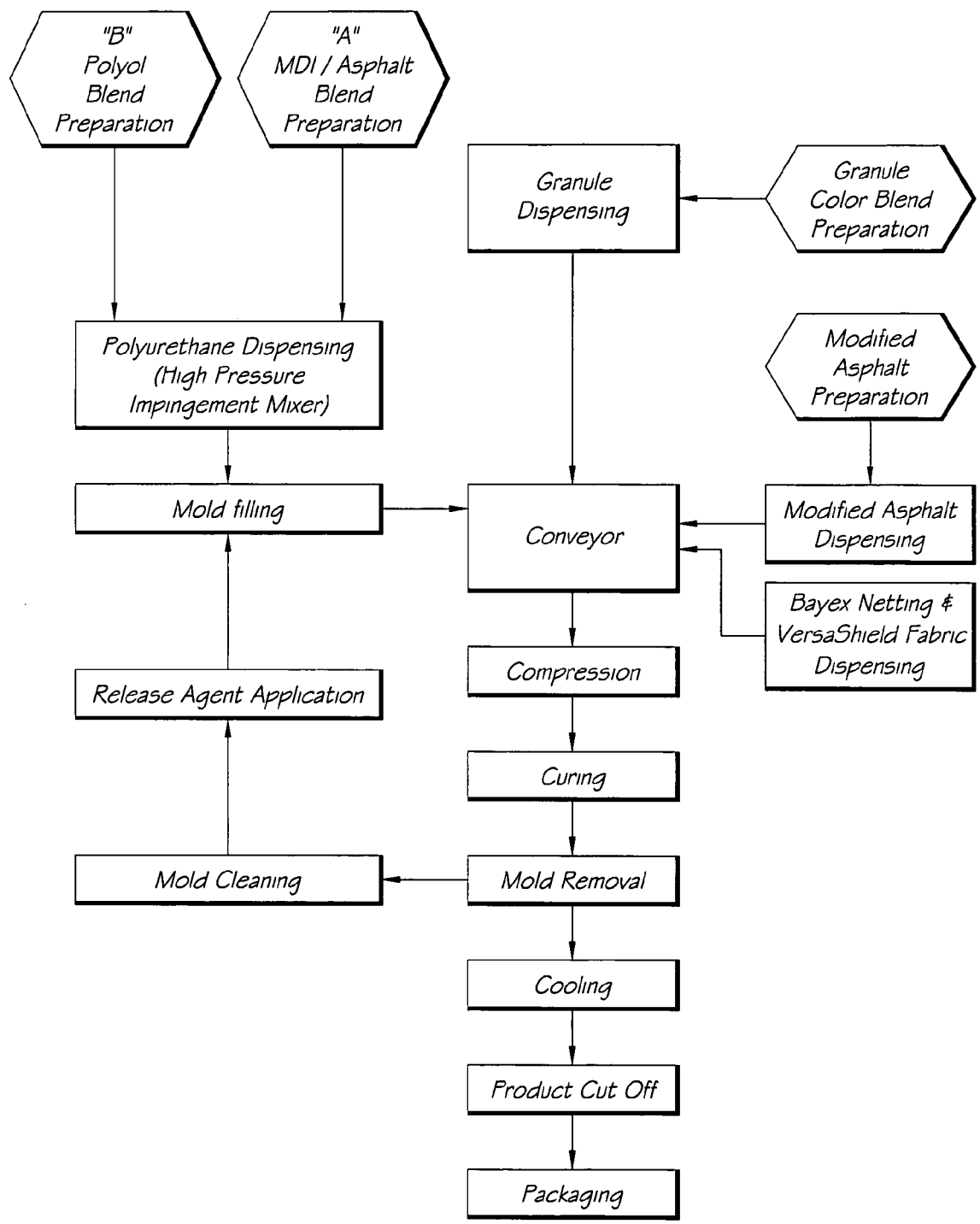
FIG. 4 shows a flow chart of a method of producing an asphaltic foam ridge cap of the preferred embodiments.

A ridge cap 10 having an elastomeric strip 20 as shown in FIG. 1A is made with the improved asphaltic foam of the preferred embodiments as follows according to the flow chart in FIG. 4. A mold is first made to contain the reacting foam and thereby form a molded asphaltic polyurethane product. The mold includes sides which form an inner surface that is 11" long on two opposite sides, and that has two other end sides of unequal length, 11" and 7" respectively. The thickness (height) of the mold end sides rises from 3/8" on the end side of the mold 70 which is 7" long to 5/8" on the end side of the mold, which is 11" long. The different lengths and thicknesses of the ridge cap 10 formed with such a mold give a tapered appearance to a ridge when the ridge caps 10 are laid one after another in a partially overlapping manner. The floor of the mold is generally flat and joins the ends of the sides.

On a flat, moving conveyor surface about 20" wide is placed a layer of roofing granules. These granules will serve as both a protective weather layer and color matching with the roof. The layer of roofing granules is about 1/4" deep, 16" wide along with the conveyor. The granules themselves are about 40 mesh in size (Grade #11).

After placing the layer of roofing granules on the conveyor surface, a strip 20 of modified asphalt is placed on top of the granules 30. The strip 20 is about 2" wide, 1/16"-1/8" deep, and is as long as the mold. The modified asphalt of this strip 20 is made up of the asphalt used to produce the foam of the preferred embodiments in admixture with about 20% (by weight of the asphalt) styrene-butyl-styrene (SBS). This modified asphalt mixture is fairly elastic. A 4"-6" strip of 1/8" fiberglass Bayex netting is placed over the modified asphalt strip, which will keep together all the parts of the product.

Alternatively, the modified asphalt can be applied on both the upside and/or the backside of a 2" fiberglass mat strip or VERSASHIELD strip, which is then pressed down on the granules.

The asphaltic foam described in Example 1 is next mixed in the impingement mixing heads and about 150-300 grams of the mixed reactants are placed in the molds. The mold includes a V-shaped member which protrudes upward from the floor of the mold to the modified asphalt strip. The V-shaped notch has sides that are at an angle of about 30° from the horizontal plane of the mold. The V-shaped notch of the mold forms an asphaltic foam that contains a V-shaped notch that contacts the modified asphalt strip at the apex of the notch 14. At its base, the V-shaped member widens from about 1/4" across at the end of the ridge cap 10 which is about 12 1/4" wide to about 3/4" across at the end of the ridge cap 10 which is 10 1/4" wide. After the asphaltic foam is produced in the mold, the mold containing the asphaltic foam is flipped about 180° so that the top of the mold contacts the granules on the conveyor belt. The asphaltic foam is then compressed and cured onto the granules.

Alternatively, the mixed reactants are dispensed on the granules that come with the conveyor belt. The molds, which are preferably heated to about 200° F. are then placed on top of the reaction mixture, which starts expanding and fills the mold cavities. In about 60 seconds the asphaltic foam is totally formed within the mold.

The inside surfaces of the molds used in the preferred embodiments are preferably treated with a spray mold release, such as a spray mold release comprising motor oil, such as CALISTA 122 motor oil 10W40.

The reacted foam on either side of the modified asphalt strip 20 in the final ridge cap product thus does not contact the reacted foam on the other side of the modified asphalt strip 20, but is instead connected by the modified asphalt strip 20. Since the modified asphalt strip 20 is elastic, the final ridge cap product can therefore be bent and re-bent without breaking or weakening the ridge cap 10.

In another embodiment, a ridge cap which has a lower surface, is adapted to be placed in contact with a roof of a building, and an upper surface. This ridge cap further comprises a longitudinal axis, the axis having a front end and a back end, and at least two sides located axially distal of the longitudinal axis. The ridge cap in this embodiment further comprises a plurality of vents, wherein the outlet ends of the vents are located in at least one of the two sides, and wherein each of the plurality of vents extends axially inward toward the central axis. In a preferred embodiment, the ridge cap includes a central channel in the lower surface located along the longitudinal axis. In this embodiment, at least one of the vents of the ridge cap further comprises a central channel opening, wherein the opening provides ventilation and communication between the central channel and the one of the vents.

EXAMPLE 2A

Figure 1B:
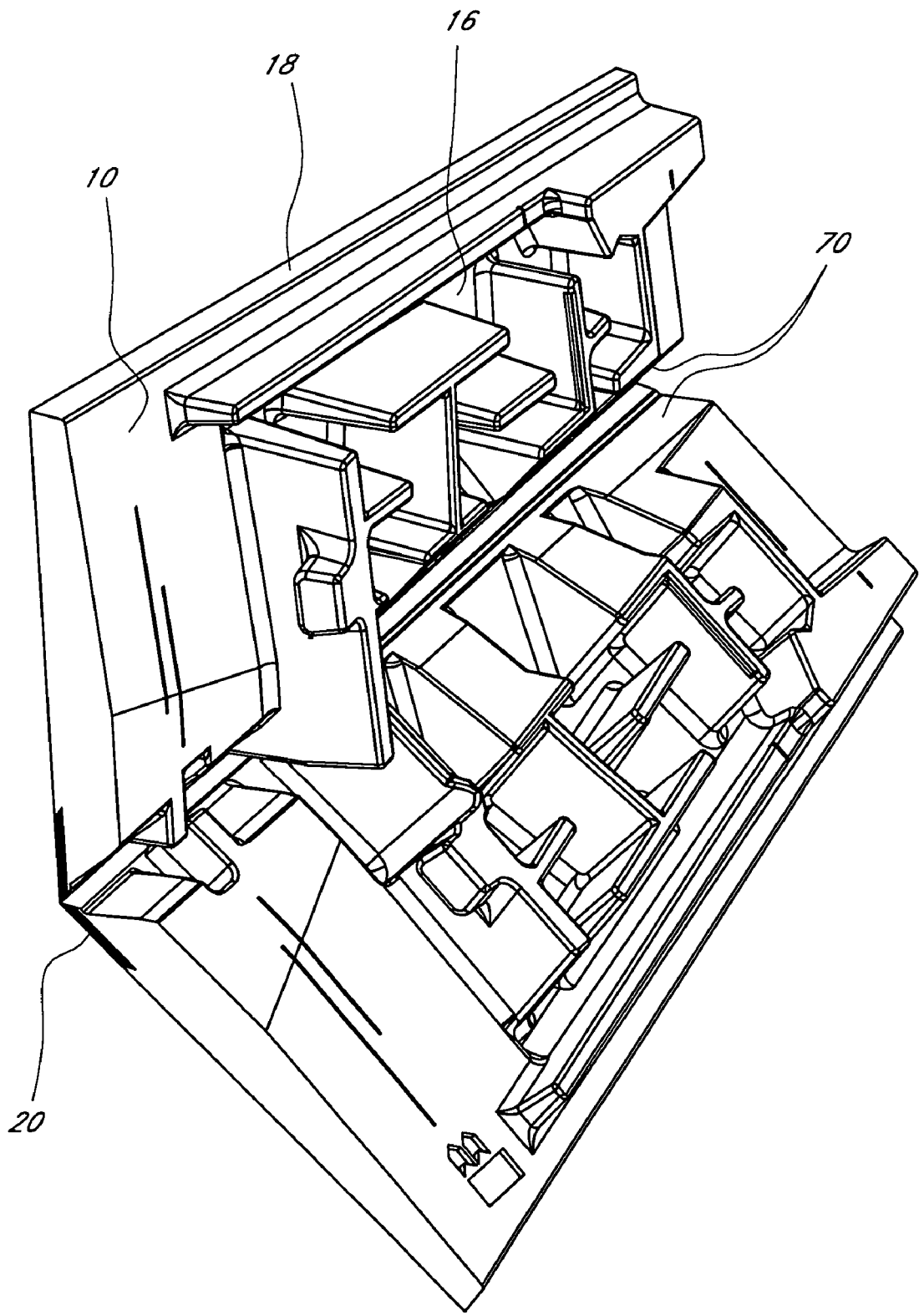
FIG. 1B illustrates a venting ridge cap turned upside down where the venting channels allowing air flow are shown.
Figure 1C:
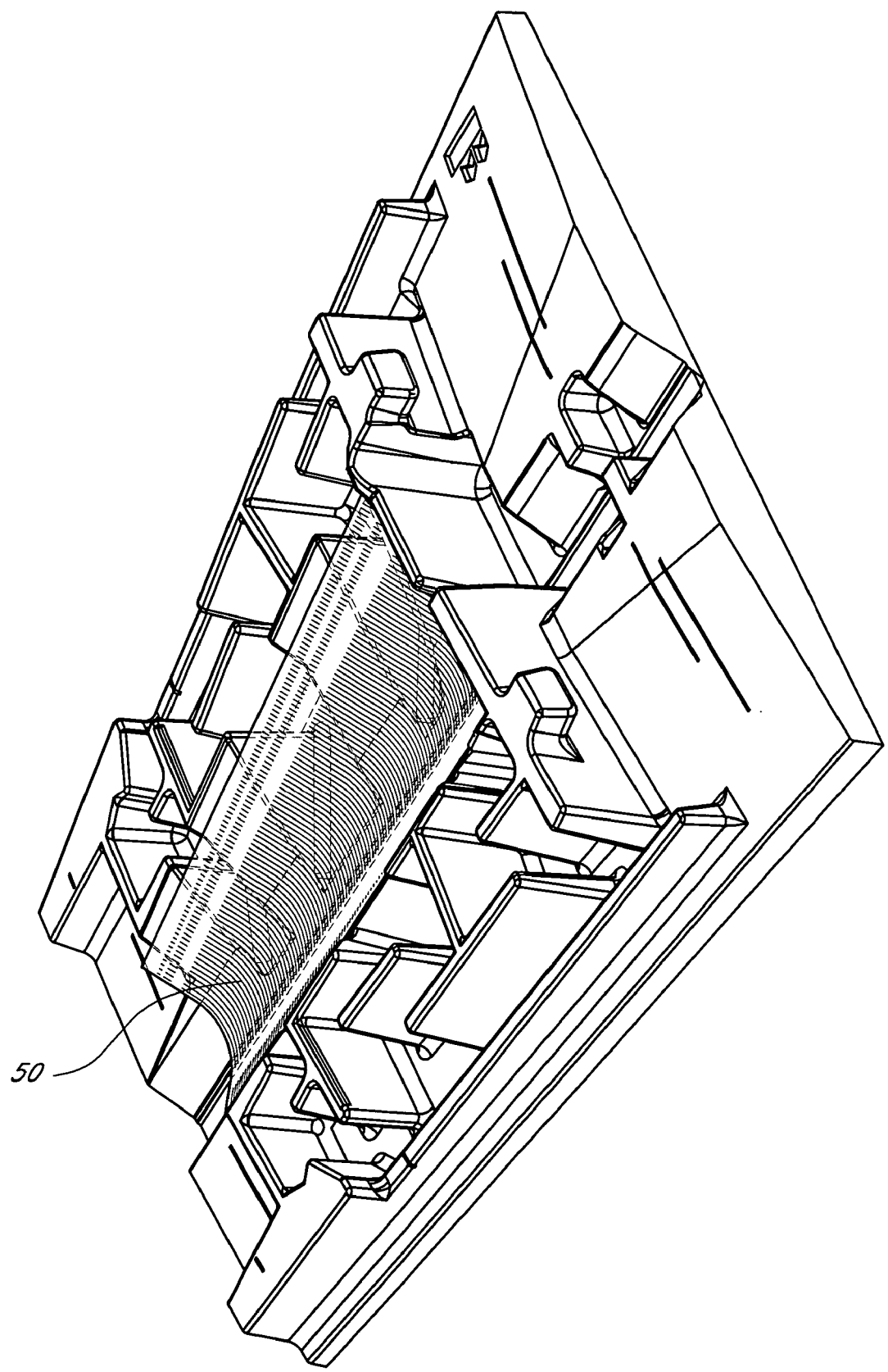
FIG. 1C shows a venting ridge cap identical to the one in FIG. 1B but a polypropylene fabric 50 is laid on the center line.

An alternative embodiment of the ridge cap of Example 2 is provided with vents so that it can function as both a ridge cap 10 and as a ridge vent (FIG. 1B). In order to provide venting, a slight indentation or vent 16 is formed in the lower surface of the ridge cap 10 between the modified asphalt strip 20 and the side edge 18 of the ridge cap 10. Such a vent can be provided by including a protruding member in the floor of the mold used to form the ridge cap 10 between the central axis of the roof of the mold 70 and the side edge of the mold. In this way, vents 16 can be provided on either side of the central axis of the ridge cap 10 (that is, the axis along which the modified asphalt strip 20 is placed). In addition, multiple vents can also be provided on either side of the modified asphalt strip 20 of the ridge cap 10. Optionally a 4-6" wide polypropylene unwove fiber mat, which is water repellent, can be stuck on the inner surface of the vented product, on the centerline (FIG. 1C, 50). When the product bends in order to be mounted on the roof, the mat will close all the venting channels creating a barrier against any moisture coming with the wind from the outside and in the same time will allow in and out air flow. Also, the polypropylene mat is intended to keep the dust and bugs from entering the attic.

B. Roofing Tiles

The asphaltic foam of the preferred embodiments is also useful in the roofing industry in producing roofing tiles 100. A roofing tile 100 as shown in FIG. 3 having similar dimensions to the ridge cap 10 described above can be made through molding in generally the same way as the previously described ridge cap. A flat, generally rectangular surface at least 17" long and at least 11" wide is first chosen as the lower surface of the mold.

On a conveyor belt is placed a layer of roofing granules 30. These granules 30 will serve as a protective weather layer for the roofing tile 100. The granules 30 themselves are about 40 mesh in size (Grade #11). The protective layer can also be slate flake or other material capable of providing protection from the weather elements.

The layer of roofing granules 30 is preferably about ¼" deep, but can be between about ³⁄₁₆" and ½" deep. The granules 30 can be indented or impressed with any desired design, pattern, or texture. The granule surface of the final molded product will then have a design corresponding to the design which has been impressed onto the granule surface.

After placing the layer of roofing granules on the moving conveyor, the asphaltic foam is produced as described in Example 1 in a mold. The sides of the mold are preferably of different lengths and thicknesses so as to lay the tiles partially overlapped in a staggered manner.

Preferably, the mold is heated to about 200° F. Heating of the mold can be accomplished with blowing hot air with fan. After the asphaltic foam is produced in the mold, the mold containing the asphaltic foam is flipped about 180° so that the top of the mold contacts the granules on the conveyor belt. The asphaltic foam is then compressed and cured onto the granules.

The inside surfaces of the molds used in the preferred embodiments are preferably treated with a spray mold release, such as a silicone based mold release. Alternatively, the inside of the molds can comprise a layer of Teflon® (PTFE) to facilitate the removal of the finished foam product from the molds. Alternatively, a spray mold release comprises motor oil, such as CALISTA 122 motor oil 10W40. Alternatively, a silicone rubber mold can be used without application of a release agent.

Figure 2:
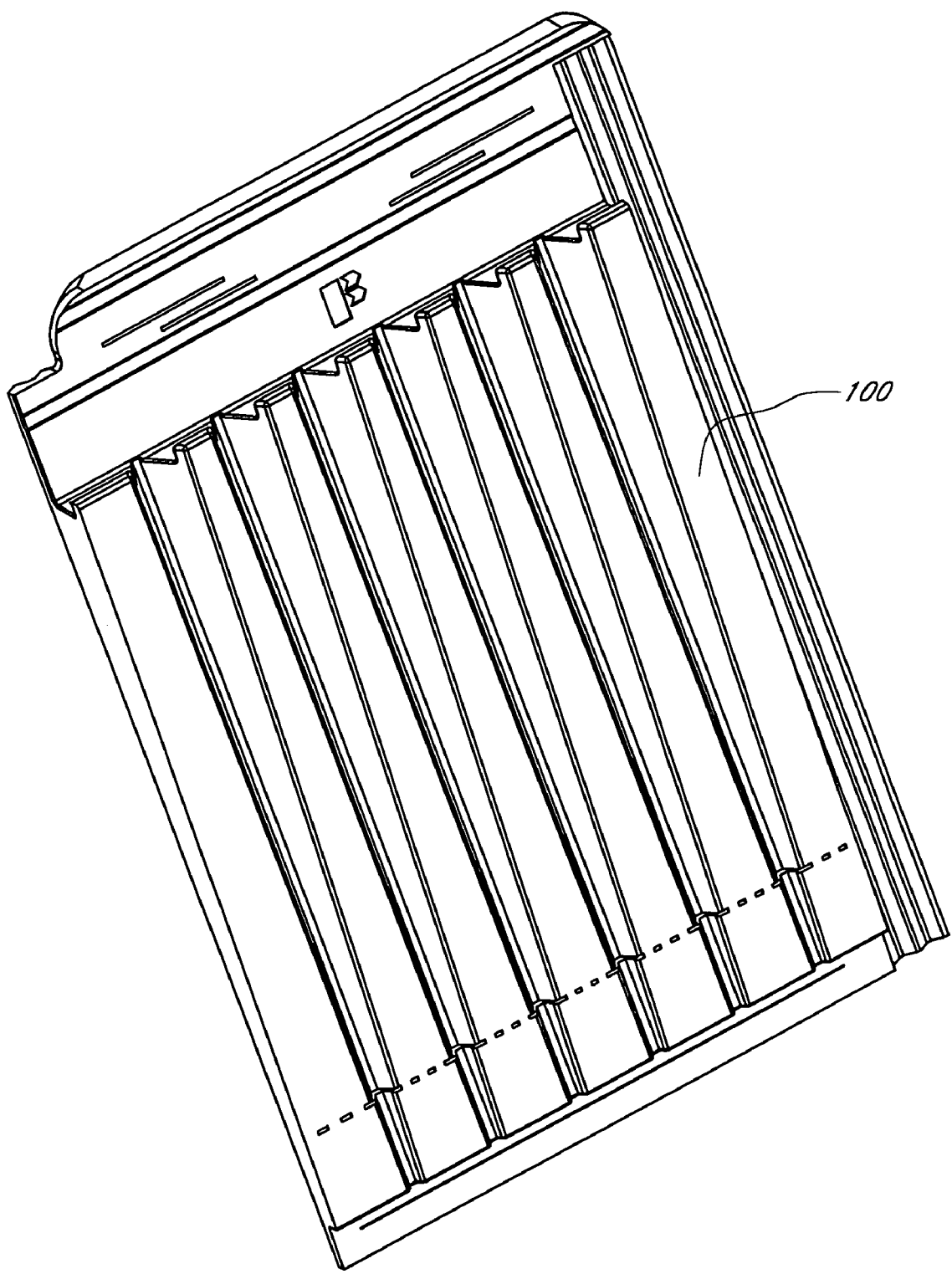
FIG. 2 shows a roofing tile with the granule top facing down.

Tiles according to the present invention are not limited to the shapes and dimensions of the tiles shown in FIGS. 2 and 3. Due to the ease of shaping plastic articles such as the asphaltic foam articles described herein, tiles made from the present asphaltic foam can be shaped, for example, to resemble conventional shake shingles, which commonly have dimensions of roughly 12-14"×20". Alternatively, tiles according to the preferred embodiments can be shaped like Spanish-style tiles, which usually have dimensions approximating 12"×36". One of skill in the art will appreciate that tiles or shingles made from the asphaltic foam of the preferred embodiments can also be shaped in a number of other ways.

EXAMPLE 3

Figure 5:
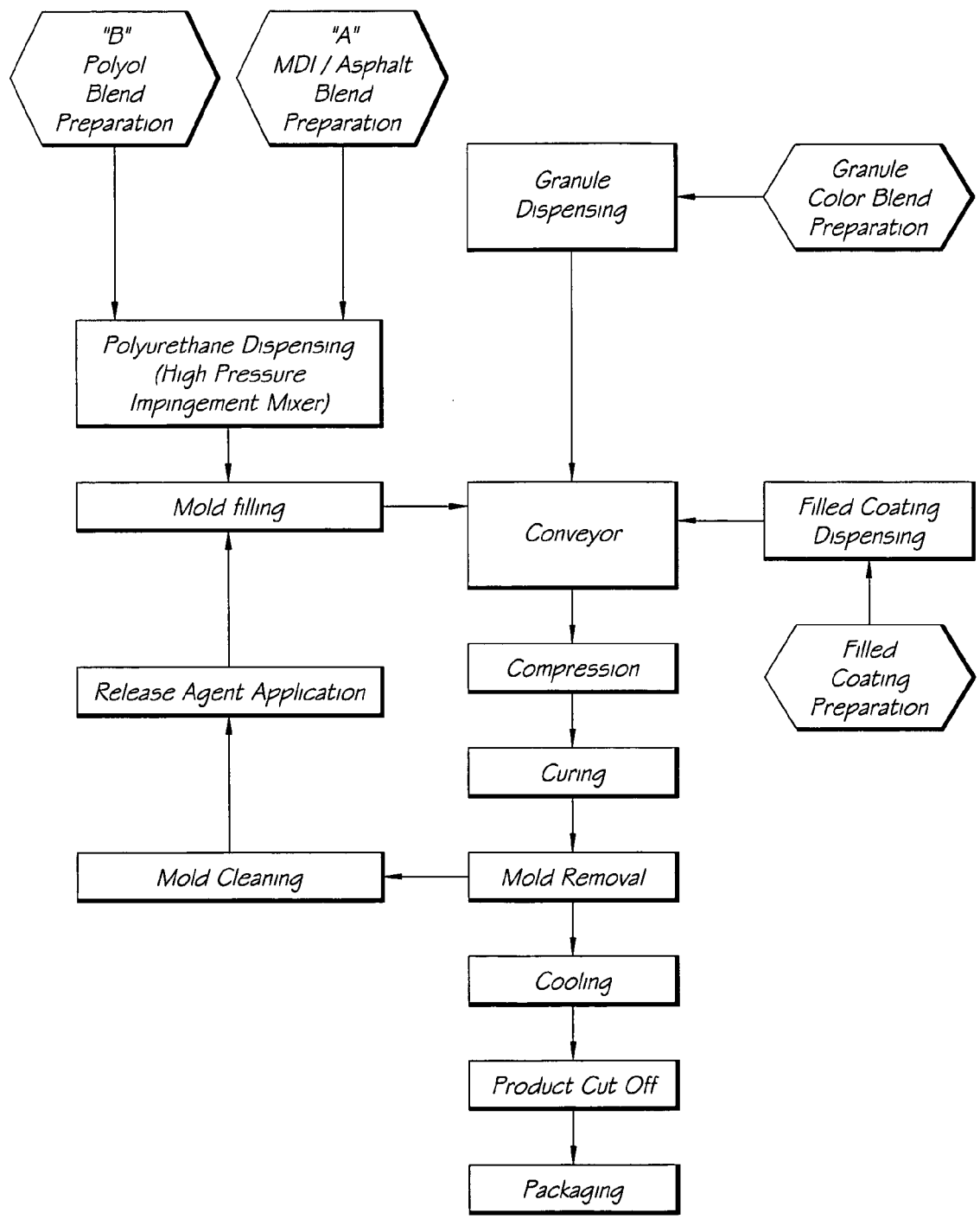
FIG. 5 shows a flow chart of a method of producing an asphaltic foam roofing tile of the preferred embodiments.

A continuous process for producing an asphaltic foam roofing tile 100 is as follows according to the flow chart in FIG. 5. In this embodiment, the upper surface of a conveyor belt forms the lower surface of the mold. The conveyor belt is preferably about 20" wide.

On this conveyor belt is placed a 16" wide layer of roofing granules 30. These granules 30 are deposited on the conveyor belt in a layer about ¼" deep. Stationary mechanical scrapers about ¼" from the conveyor belt surface extending the width of the conveyor belt assure a relatively even thickness of granules 30 in the granule layer by scraping and thereby leveling the granule layer 30 as it passes underneath the scrapers.

The asphaltic foam described in Example 1 is next mixed, and about 150-300 grams of the mixed reactants are dispensed on the granules that come with the conveyor belt. The molds, which are preferably heated to about 200° F. are than placed on top of the reaction mixture, which starts expanding and fills up the mold cavities. In about 40 seconds the asphaltic foam is totally formed within the mold.

Alternatively either a thin layer of filled coating (about ¹⁄₁₆" thick), having the same width with the product or a coated fiberglass mat can be laid on top of the granules, just before the reaction mixture is dispensed.

The inside surfaces of the molds used in the preferred embodiments are preferably treated with a spray mold release comprising a wax, such as CALISTA 122 and motor oil 10W40. Alternatively, an odorless mineral spirit can be used together with the wax or pure silicone oil.

Once the final roofing tile product 100 has been formed and cured, the molds are removed from the products. Consecutive roofing tiles 100 can then be separated after formation.

C. Producing Tiles and Ridge Caps with Granule Patterns

Figure 3A:
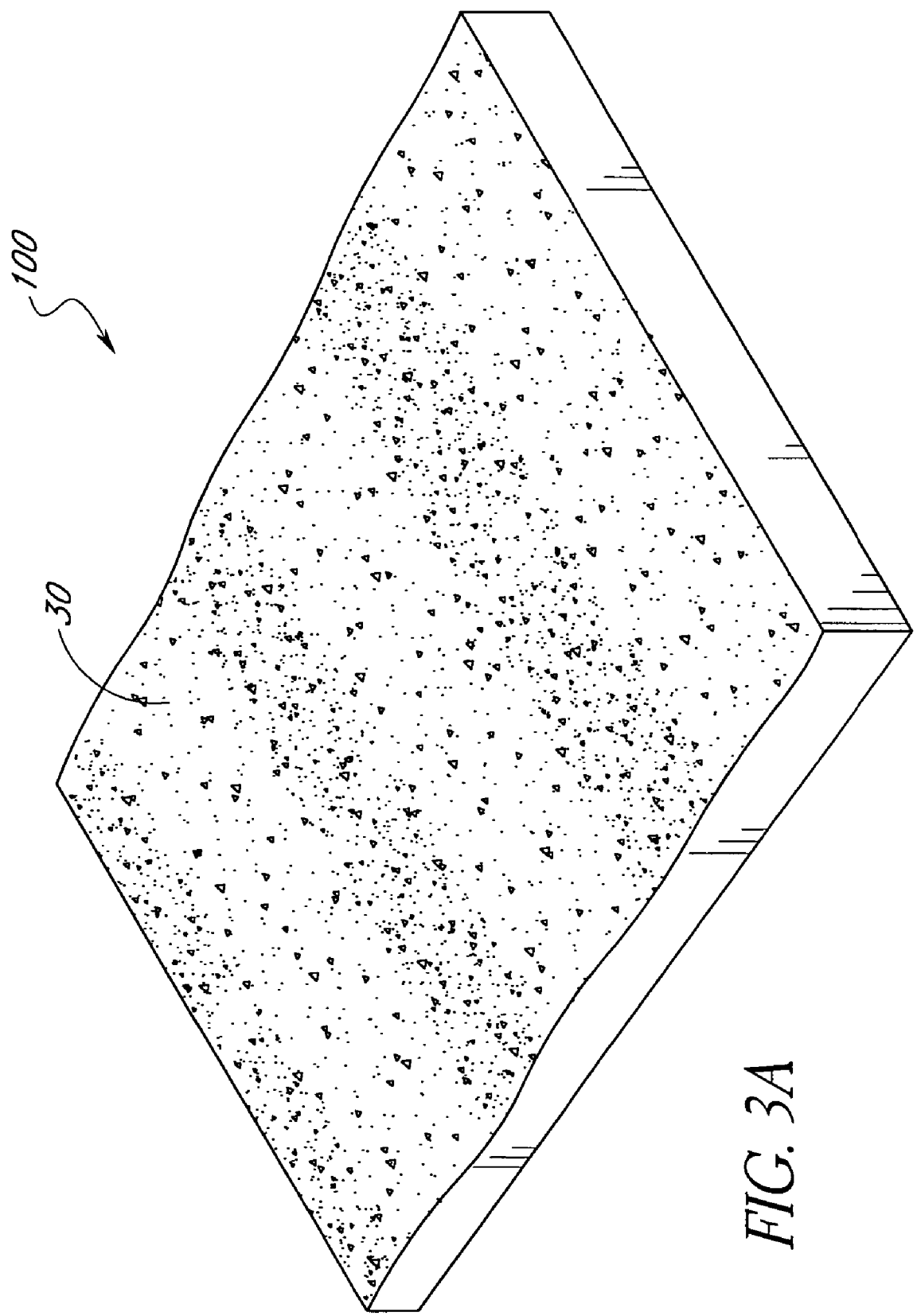
FIG. 3A shows a roofing tile with a wavy granule top.

Various shape and color patterns can be produced on the granule surface of tiles, ridge caps, and other articles made according to the preferred embodiments. For example, a wave pattern can be produced on a roofing tile or ridge cap by passing a modified roller over the surface of the granules prior to dropping the asphaltic foam on them. Such a roller is generally cylindrical but also has a protruding member which extends axially from the cylindrical roller. When this roller is passed over the granules 30, it will form a flat, even granule surface except where the protruding member contacts the granule layer. Where the protruding member contacts the granule layer, an indentation is formed in the granule layer. After the reaction mixture is added to the granule layer, the mixture will foam and fill in the indented portion of the granule layer. The final roofing tile product 100 will have a "wave" pattern as a result, as seen in FIG. 3A.

Other shapes or patterns can, of course, also be impressed on the granule layer to produced granule surfaces having different designs. The granules can be indented or impressed with any desired design, pattern, or texture, which is then transferred to the foam dropped on the granules. For example, a roller comprising a cylindrical fluted roll or a cylindrical roll having a design embossed thereon can be rolled over the granule layer in order to impress a pattern on it. This pattern will be retained in the final foam product as long as the foam does not disturb the pattern when it is laid on the granule layer.

The roofing granules 30 can also be colored or shaded in order to produce a desired aesthetic effect in the final molded product. For example, blended colored roofing granules can be dropped onto a moving conveyor belt. Alternatively, roofing granules of a single color or a mixture of colors can be deposited on the surface of such a conveyor belt, after which granules of a different single color or mixture of colors are dropped onto the surface. In this way, a desired pattern can be produced on the surface of the final molded article through the use of such different colored granules. Through the use of granules of at least two colors or two shades of a single color, a shadowing effect can be produced in the final ridge cap product.

In one embodiment, several discharge holding tanks, each holding different color granules, or a single discharge holding tank holding different color granules in different compartments, are used. As a conveyor belt underneath the holding tanks moves by, granules of a first color will be deposited on the conveyor belt for a predetermined amount of time from a first gate in order to cover a predetermined portion of the surface of a tile, ridge cap, or other article with granules of the first color. Of course, the first or succeeding color granules can also comprise a mixture of colors of granules.

After the first color granules are deposited on the conveyor belt, granules of a second color are deposited on the conveyor belt from a second gate for a predetermined period of time. Following this, granules of a third or succeeding color can be deposited on the conveyor belt, or granules of the first color can again be deposited. In this way, vertical bands of granules of different colors can be formed in the tiles, ridge caps, or other articles formed by this method.

Alternatively, horizontal bands of color can be formed on a tile, ridge cap, or other article by placing the opening of a discharge tank holding granules of a first color side by side with the opening of a discharge tank holding granules of a second color. The openings should, of course, together be only as wide as the conveyor belt surface.

EXAMPLE 4

Figure 3B:
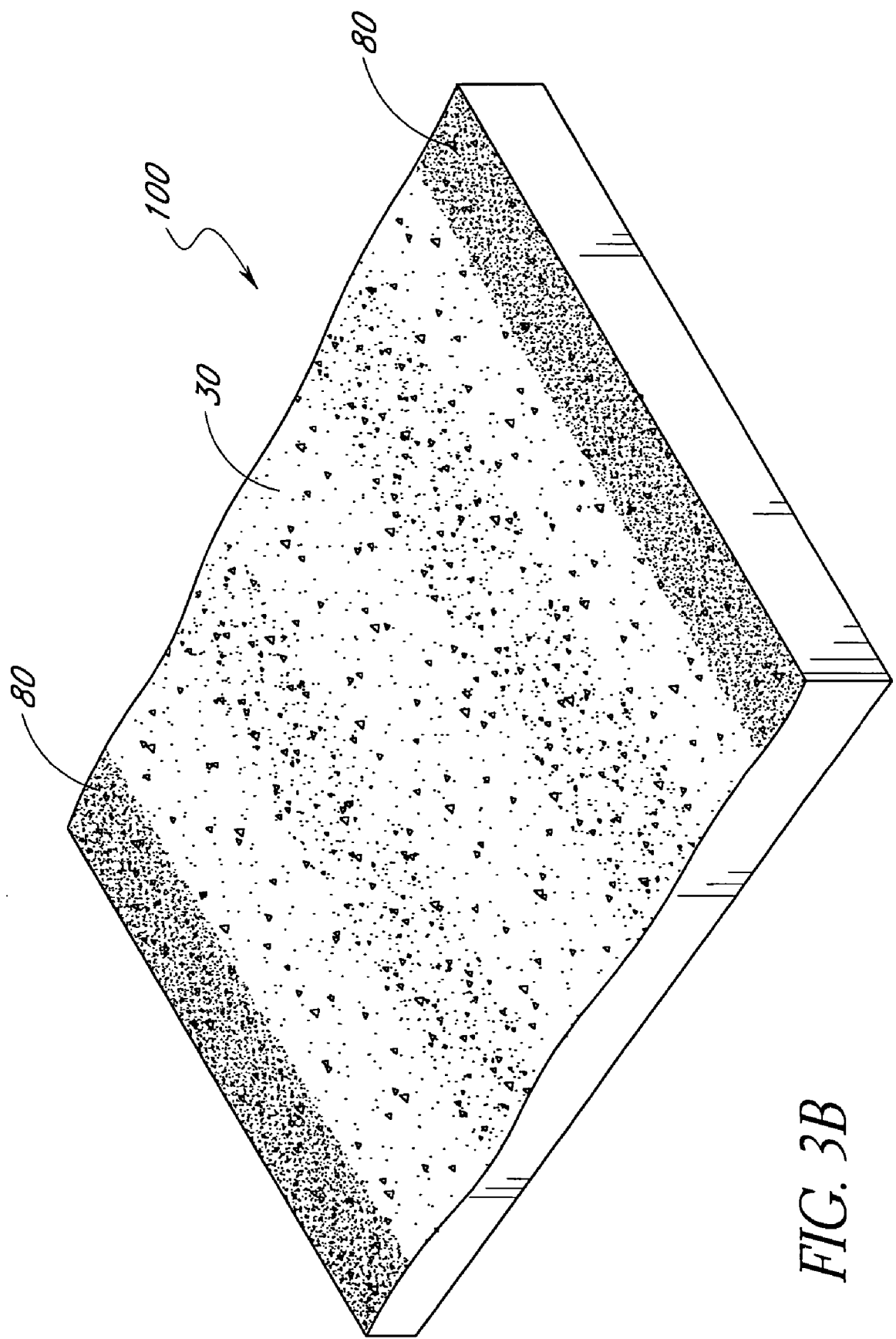
FIG. 3B is similar to FIG. 3A but additional granules with color different from the rest of the tile, are deposited at two ends of the tile.

The roofing tile 100 of Example 3 can be produced with decorative patterns of granules 30 in which the granules 30 have different colors. Granules 30 having a darker color are first dropped onto the surface of the conveyor belt over a short portion of the conveyor belt (on the order of 1-3 inches) to form a dark band 80. Granules 30 having a lighter color are then dropped on the conveyor belt over a length of 6-10 inches, after which darker granules 30 are again dropped onto the belt, forming a second dark band 80. A roofing tile 100 is then produced as described in Example 3. The product of this process is depicted in FIG. 3B.

IV. Conclusion

Although the present invention has been described herein in terms of certain preferred embodiments, these embodiments are illustrative only and do not limit scope of the present invention. Thus, those of skill in the art will appreciate that there are other ways of making and using the present invention besides those explicitly described herein which fall within the scope of this invention. The references referred to herein are, in addition, hereby incorporated by reference.

What is claimed is:

1. A method for producing asphaltic foam comprising the steps of:
    providing an asphalt;
    liquefying said asphalt;
    adding to said asphalt one or more isocyanates, thereby forming a first intermediate mixture;
    bringing the temperature of said first intermediate mixture to between about 120° F. and 170° F.;
    forming a second intermediate mixture comprising one or more polyols, a blowing agent, and a surfactant, wherein the second intermediate mixture is segregated from the first intermediate mixture;
    forcing said first intermediate mixture through a first impingement dispensing head;
    forcing said second intermediate mixture through a second impingement dispensing head; and
    mixing said first intermediate mixture forced through said first impingement dispensing head with said second intermediate mixture forced through said second impingement dispensing head, thereby forming a final reaction mixture, wherein said first intermediate mixture and said second intermediate mixture react and expand in a controllable manner such that the final reaction mixture does not expand beyond a form desired in a final molded asphaltic foam or cure before taking on said form to produce said asphaltic foam.

2. The method of claim 1, wherein the asphalt comprises the following components:
    about 12-13% by weight asphaltene;
    about 9-12% by weight saturated hydrocarbons;
    about 38-44% by weight polar components; and
    about 35-38% by weight naphthalene aromatic constituents.

3. The method of claim 1, wherein the second intermediate mixture comprises at least one additional ingredient selected from the group consisting of catalyst and fire retardant.

4. The method of claim 1, wherein the surfactant is a silicone surfactant.

5. The method of claim 3, wherein the catalyst is a curing catalyst.

6. The method of claim 3, wherein the fire retardant is TCPP.

7. The method of claim 1, wherein the isocyanate is polymeric methylene diphenyl diisocyanate (MDI).

8. The method of claim 1, wherein the first intermediate mixture comprises about 1:1 to about 1.5:1 polyisocyanate: asphalt.

9. The method of claim 1, wherein the polyol is an amino-based polyol.

10. The method of claim 1, wherein the blowing agent is selected from the group consisting of water, halocarbons, and mixture of ethanol and dibutylpthalate.

11. A method of forming a ridge cap or roofing tile comprising the steps of:
    providing a conveyor belt;
    applying a granule layer to said conveyor belt;
    providing a mold with a top side open;
    filling the mold with a reaction mixture produced by a method of claim 1;
    applying the mold with the open side down on said granule layer; and
    curing the asphaltic foam; thereby forming the ridge cap or roofing tile.

12. The method of claim 11, additionally comprising the step of forming an indentation on said granule layer after applying the granule layer on said conveyor belt.

13. The method of claim 11, additionally comprising the step of applying a second granule layer having a contrasting color compared to the color of said first granule layer.

14. The method of claim 11, wherein said mold comprises an indentation.

15. The method of claim 11, further comprising applying a strip of modified asphalt onto the granule layer before applying the asphaltic foam.

16. The method of claim 15, further comprising applying a fire resistant roofing underlayment onto the strip of modified asphalt.

17. The method of claim 16, wherein the fire resistant roofing underlayment is a coated substrate product with fire-resistant qualities.

18. The method of claim 11, wherein the second intermediate mixture comprises at least one additional ingredient selected from the group consisting of catalyst and fire retardant. .

19. The method of claim 18, wherein the catalyst is a curing catalyst.

20. The method of claim 11, wherein the surfactant is a silicone surfactant.

21. The method of claim 11, wherein the isocyanate is polymeric methylene diphenyl diisocyanate (MDI).

22. The method of claim 11, wherein the first intermediate mixture comprises about 1:1 to about 1.5:1 polyisocyanate: asphalt.

23. The method of claim 11, wherein the polyol is an amino-based polyol.

24. The method of claim 11, wherein the blowing agent is selected from the group consisting of water, halocarbons, and mixture of ethanol and dibutylpthalate.

25. The method of claim 1, wherein the mixing step produces an initial cream time in which the final reaction mixture thickens.

26. The method of claim 1, wherein the initial cream time lasts for about 15 to 20 seconds.

27. The method of claim 1, wherein the mixing step lasts about 2 to 6 seconds.

28. The method of claim 25, wherein the initial cream time is followed by an expansion stage in which production of $CO_2$ causes expansion of the final reaction mixture.

29. The method of claim 1, wherein the blowing agent volatizes during the expansion stage.

30. The method of claim 1, further comprising placing said final reaction mixture in a mold or placing a mold around the final reaction mixture;
   expanding the final reaction mixture in the mold; and
   curing the expanded final reaction mixture.

* * * * *

UNITED STATES PATENT AND TRADEMARK OFFICE
CERTIFICATE OF CORRECTION

PATENT NO. : 8,017,663 B2  
APPLICATION NO. : 10/772049  
DATED : September 13, 2011  
INVENTOR(S) : George F. Thagard et al.

Page 1 of 1

It is certified that error appears in the above-identified patent and that said Letters Patent is hereby corrected as shown below:

In Column 3, Line 61-62, please change "butydiene" to --butadiene--.

In Column 6, Line 27, please change "butydiene" to --butadiene--.

In Column 7, Line 39, please delete "about" after "about".

In Column 8, Line 6, please change "poly(oxypropyrene)" to --poly(oxypropylene)--.

In Column 15, Line 2, please change "thickness" to --thicknesses--.

In Column 21, Line 4, In claim 18, please delete "." after "retardant.".

In Column 22, Line 13-15, In claim 30, please change "comprising" to --comprising:--, and separate the first paragraph into two paragraphs to read as follows:

30. The method of claim 1, further comprising:
placing said final reaction mixture in a mold or placing
a mold around the final reaction mixture;

Signed and Sealed this
Seventeenth Day of April, 2012

David J. Kappos
*Director of the United States Patent and Trademark Office*